Dec. 9, 1952     R. K. TIEDEMAN ET AL     2,620,887
ELECTRICALLY OPERATED PROPELLER PITCH CHANGE MECHANISM
Filed Sept. 30, 1947     4 Sheets-Sheet 1

INVENTORS
ROBERT K. TIEDEMAN
JOSEPH M. MERGEN
CHARLES W. CHILLSON
BY Godfrey B. Speir
ATTORNEY

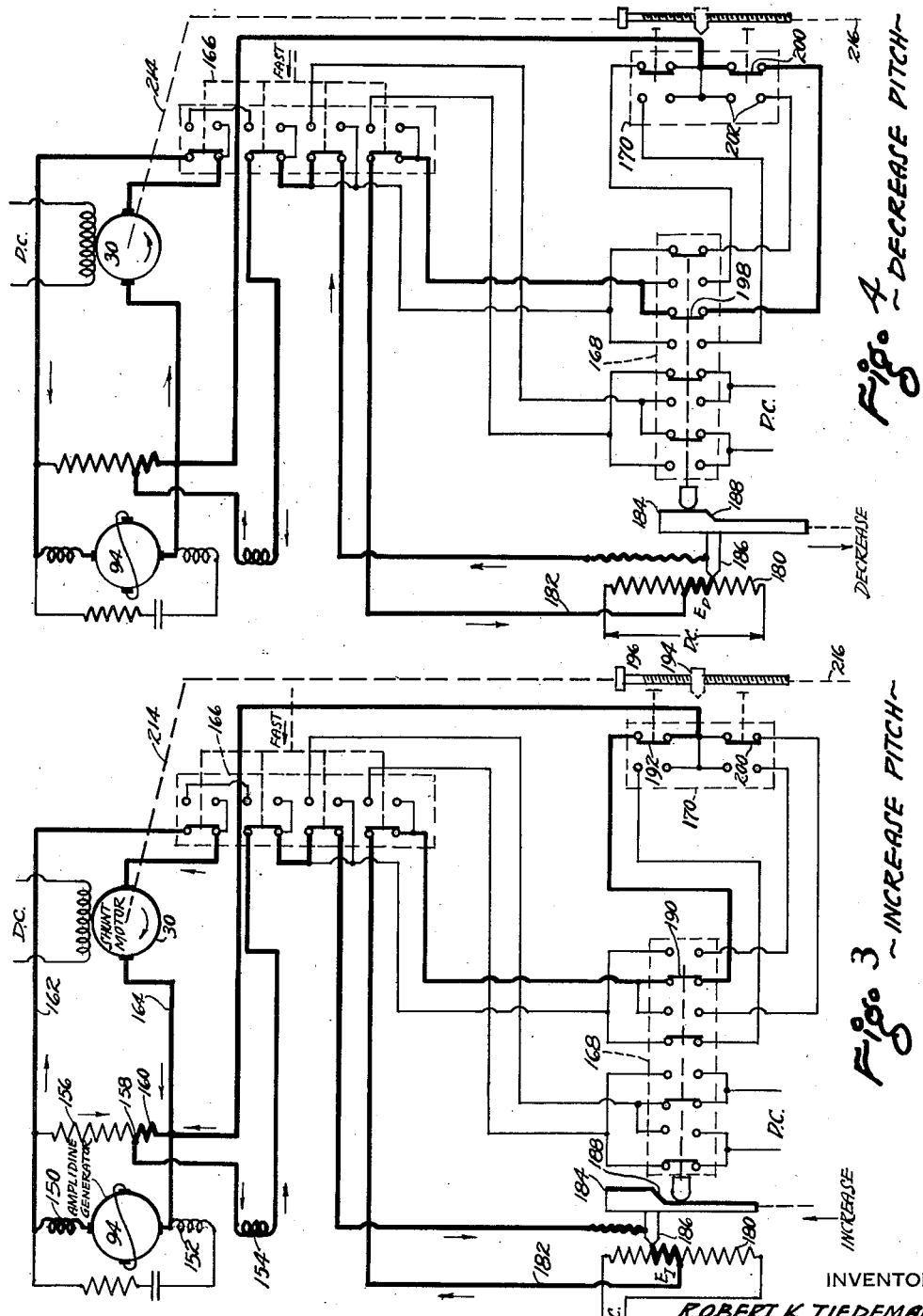

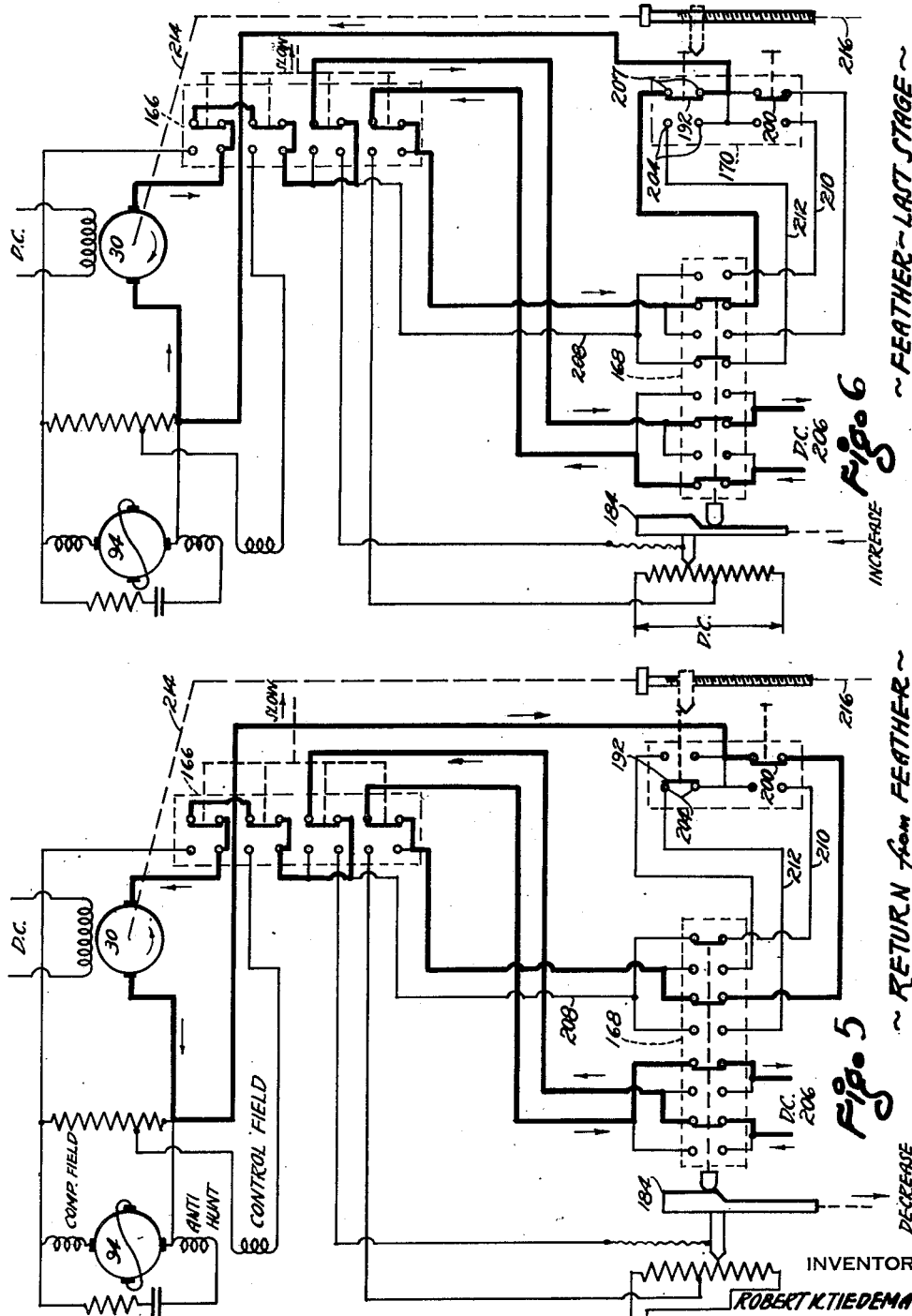

Dec. 9, 1952   R. K. TIEDEMAN ET AL   2,620,887
ELECTRICALLY OPERATED PROPELLER PITCH CHANGE MECHANISM
Filed Sept. 30, 1947   4 Sheets-Sheet 4
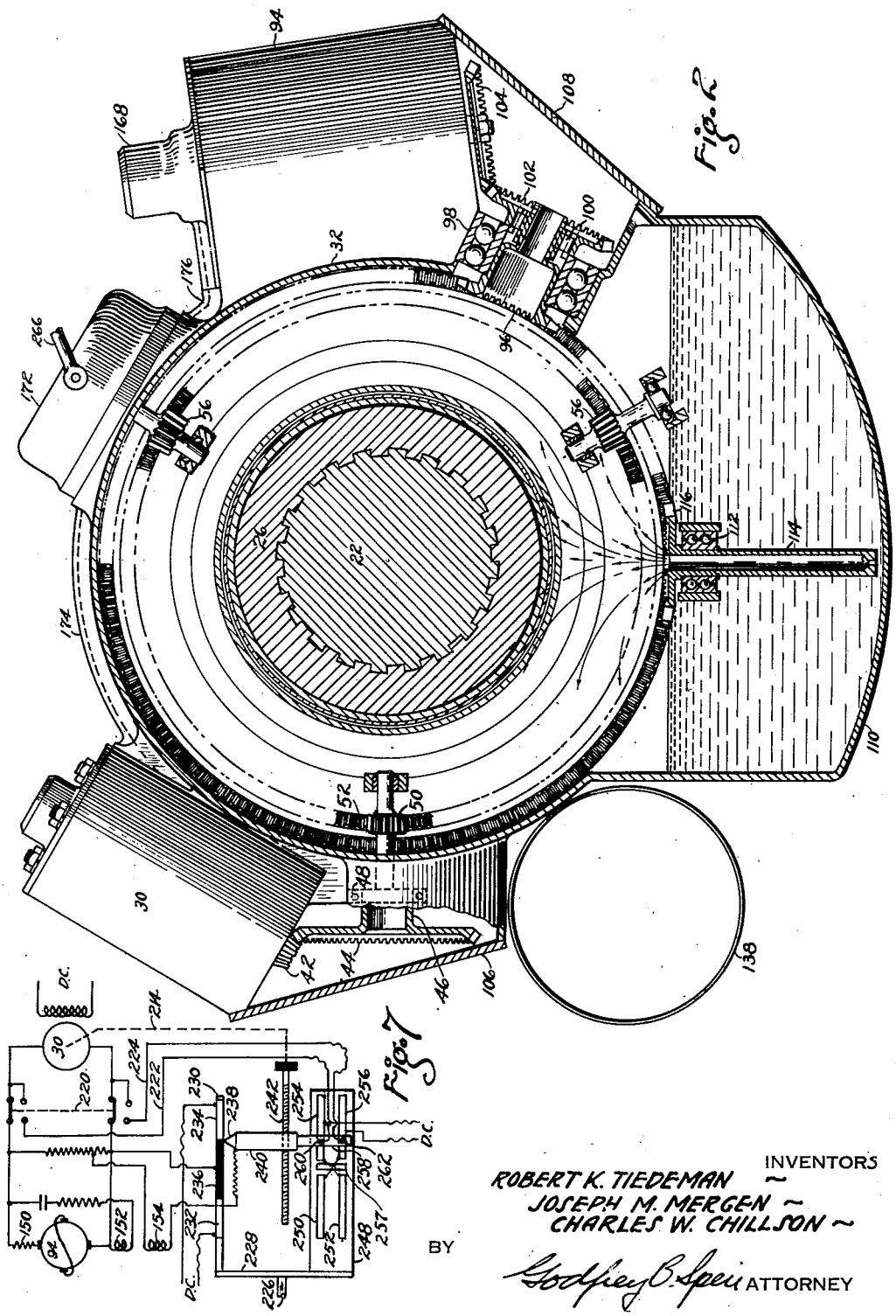
INVENTORS
ROBERT K. TIEDEMAN
JOSEPH M. MERGEN
CHARLES W. CHILLSON
BY
Godfrey B. Speir ATTORNEY Patented Dec. 9, 1952

2,620,887

UNITED STATES PATENT OFFICE 2,620,887

ELECTRICALLY OPERATED PROPELLER PITCH CHANGE MECHANISM

Robert K. Tiedeman, Packanack Lake, Joseph M. Mergen, Verona, and Charles W. Chillson, Caldwell, N. J., assignors to Curtiss-Wright Corporation, a corporation of Delaware Application September 30, 1947, Serial No. 776,956

5 Claims. (Cl. 170—160.35)

This invention relates to controllable pitch propellers for aircraft and is concerned particularly with a self-contained propeller which derives pitch changing power from the propeller prime mover, converts such power to electrical energy, and controls and delivers the energy to a pitch changing electric motor carried by the propeller.

While propellers having electrical pitch change means are well known in the art, such propellers in general derive their pitch changing energy from a power source on the aircraft, and the pitch changing power is regulated by suitable governor mechanisms responsive to engine or propeller speed. In the present invention, a generator preferably of amplidyne type is driven by the propeller or by the prime mover and the generator output is controlled in accordance with engine speed or other operating conditions to produce controlled electrical power for a propeller-mounted pitch changing motor. There are periods during operation of the aircraft power plant when the propeller or prime mover may not be in operation and to enable propeller blade pitch adjustment during these periods, a separate source of electrical power is automatically connected to the propeller pitch changing motor to enable proper pitch adjustment.

The propeller disclosed herein is capable of normal governed operation, feathering, unfeathering, reverse pitch and return from reverse pitch. The propeller is further adapted for use with internal combustion turbines so that pitch changing signals may be imposed upon the propeller and translated into actual pitch change, from a governor or regulator mechanism forming a part of the power plant system separate from the propeller. Provision is made to change propeller pitch at continuously varying rates, to and including a high rate for feathering and reversing and other purposes, or pitch changes may be made according to desired blade pitch angle, the latter mode of control being called beta control.

Objects of the invention are, to provide a self-contained electrically operated aircraft propeller having great operating flexibility; to provide a propeller mechanism which is particularly insensitive to wide variations in operating temperature by its freedom from hydraulic mechanisms; to provide a propeller whose rate of pitch change may be high or low according to operating demands; to provide a propeller having electrical components forming an integral part thereof and having a generator integral therewith whose power is derived from rotation of the propeller or from the prime mover driving the propeller. In this connection, high rates of pitch change require a substantial amount of power, larger than that which may be conveniently or safely taken from the usual aircraft electrical power system. With the engine or propeller driven generator, large amounts of pitch changing power may be provided on demand without overloading the aircraft electrical system. Further objects of the invention are to provide an electrical power system for a propeller which is highly responsive and sensitive to demands for propeller pitch change in order that the fast propeller pitch change response normally required for internal combustion turbine power plants may be attained. Still another object is to provide a specific propeller structure, incorporating the necessary mechanical and electrical components, suitable for use with any appropriate type of prime mover.

Further objects of the invention will become apparent in reading the annexed detailed description in connection with the drawings. The latter, however, are not to be construed as limiting the scope of the invention since it will be apparent to those familiar with the art that certain modifications and changes may be made therein. The scope of the invention is defined in the claims.

In the drawings, in which similar reference characters designate similar parts,

Fig. 2 is a section of the propeller pitch change components on the line 2—2 of Fig. 1;

Figs. 3, 4, 5 and 6 are schematic wiring diagrams of one electrical system of the invention adapted for rate of blade pitch change control; and Fig. 7 is a schematic diagram showing an alternative electrical system of the invention adapted for blade pitch angle control.

Figure 1:
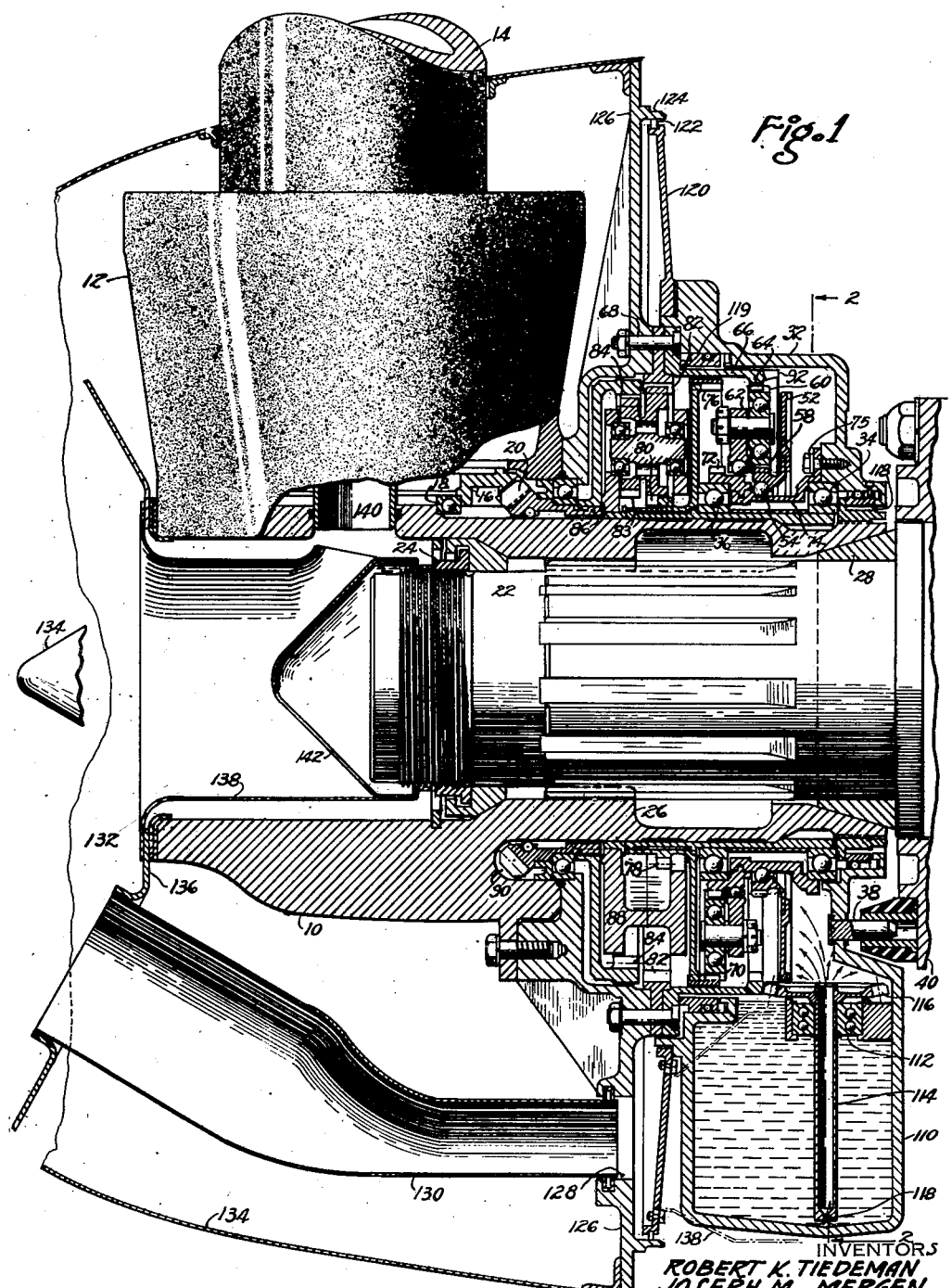
Fig. 1 is a longitudinal section through a propeller according to the invention.

Referring first to Figs. 1 and 2, we show a unitary propeller hub 10 provided with a plurality of blade receiving sockets, one of which is shown at 12. Within each socket is mounted a blade 14, the blade mounting being of any appropriate type but preferably of the centrifugal twisting moment compensating type disclosed in Maurice E. Cushman's application, Serial No. 722,253, filed January 15, 1947, issued as U. S. Patent No 2,566,696 on September 4, 1951. Such a blade mounting compensates the centrifugal twisting moments on blades and enables pitch changing power required for the blades to be drastically reduced.

The inner end of each blade, within the socket 12, is drivably connected to blade gear 16 drivably coupled, preferably by an Oldham type coupling (not shown), to the blade butt. The gear 16 is piloted on the hub 10 on a bearing 18 and by virtue of the Oldham coupling, the blade may weave a limited amount in its socket without affecting the concentricity of the gear 16. Pitch change force is applied to the gear 16 and similar gears for other blades, by a master gear 20 meshed therewith and coaxial with a propeller shaft 22 and the hub 10.

The internally splined hub is attached in the usual manner to the splined shaft 22 by a hub nut 24. The hub 10 is provided with a rearward substantially cylindrical extension 26, the rearward end of which engages the conventional tapered bushing 28 on the propeller shaft 22. Embracing the extension 26 and piloted thereon is a gear train, which will now be described, serving to impart pitch changing motion to the master gear 20 from a pitch changing electric motor 30 (Fig. 2) mounted on a stationary housing 32 forming a rearward portion of the propeller assembly.

The housing 32, piloted on the extension 26 by a rearward bearing 34 and by a forward bearing 36, is doweled as at 38 to the prime mover or power plant nose 40 whereby said housing is held against rotation with the propeller hub. By its piloting upon the propeller hub extension 26, the housing is at all times concentric with the shaft 22 even though the shaft may weave to a limited extent relative to the prime mover.

As shown in Fig. 2, the motor 30, tangentially mounted on the housing 32, carries a driving pinion 42 engaging a bevel gear 44 having a shaft 46 borne in the housing in bearing 48. The inner end of the shaft carries a driving pinion 50 engaging a large diameter bevel gear 52 mounted upon a bearing 54 carried by a stationary sleeve 74. Additional idler guide pinions 56 are borne in the housing 32 to steady the gear 52, and engage the gear at several points on its circumference. One of these pinions may serve an additional function as will be described. The gear 52 carries a sun gear 58 engaging the inner runs of planet pinions 60 carried on a spider 62 concentric with the propeller shaft for rotation with and with respect thereto, said planets at their outer runs engaging an internal gear 64 formed on a drum 66 secured to the propeller hub 10 as by bolts 68. The spider or planet carrier 62 carries another set of planet pinions 70 rotatable with and with respect to the carrier, shown in the lower portion of Fig. 1, said pinions engaging at their inner runs a sun gear 72 fixed against rotation through the sleeve connection 74 secured to the housing 32 at 75. The outer runs of the planet pinions 70 engage a ring gear 76 piloted on the hub extension 26 and formed with a driving sun pinion 78.

The gearing structure thus far described comprises a transfer gear set so that pitch changing rotation of the motor 30 may be imparted to the propeller blades. When the motor is not energized, the gear 52 and sun gear 58 are stationary. The ring gear 64 rotates at propeller speed and accordingly the planet carrier 62 rotates at some function of propeller speed depending on the gear diameters. Through the planets 70, the gear 76 is constrained to rotate at propeller speed in view of the fact that the sun gear 72, engaged with said pinions, is stationary. Whenever pitch changing rotation is imparted to the sun gear 58, the internal gear 76 on the opposite side of the carrier will rotate at greater or less than propeller speed and its movement with respect to the propeller is then translated into pitch changing motion of the master gear 20 which drives the blades.

This translation is effected through a planetary reduction gear rotating with the propeller of which the sun gear 78 forms the driving member. The gear 78 engages the inner runs of planet pinions 80 whose outer runs are engaged with a ring gear 82 secured to the propeller hub. The planet pinions 80 carry compound planet pinions 83 whose outer runs mesh with an internal gear 84 secured directly to the hub of the master gear 20 through a spline connection 86. The compound planets 80, 83 are carried on a spider 88 embracing and piloted on the hub extension 26. Appropriate bearings and bushings are provided throughout the gearing assembly to hold the gearing elements in their proper relationship and to allow of assembly of the entire gear set upon the propeller hub extension. The gears 78, 80, 82 and 84 comprise a speed reducer which with the drive from the motor 30, provides an overall speed reduction between motor and blades of the order of 2500:1.

The master gear 20 enters an annular recess 90 in the hub 10 from the power plant end, said recess when formed, breaking into the cavities in the blade sockets 12 to enable engagement of the master gear 20 with the blade gears 16. This construction is different from that usually encountered in gear driven blades in controllable propellers since in most instances, the master gear arrangement is disposed in that end of the propeller remote from the power plant or prime mover and the gearing is carried on the clear end of the propeller rather than on its power plant end.

The drum 66 which carries the propeller-speed internal gear 64 has a portion thereof formed as a bevel gear 92. This gear 92, rotating at propeller speed since it is fixed to the propeller hub, serves as a driving means for an amplidyne or other form of generator 94 secured preferably in a tangential position to the stationary housing 32. The generator drive is accomplished through a bevel pinion 96 meshed with the gear 92, said bevel gear 96 being carried in bearings 98 in the housing 32, the gear shaft having its rightward end as shown in Fig. 2, splined to receive a splined collar 100 engaged within a bevel gear 102 meshed with a bevel gear 104 mounted on the shaft of the generator 94. By removal of the splined collar 100, which is provided with suitable detachable securing means, the gear 102 may be removed to permit, as desired, external driving of the generator 94 for test purposes when the propeller is not rotating.

The gear drives between the motor 30 and the propeller and between the propeller and the generator 94 are within the housing 32, which has access ports covered by plates 106 and 108 which are readily removable from outside of the propeller to enable inspection or repair of the mechanism.

The lower part of the housing 32 is formed as an oil sump 110, having suitable level determining filler openings, not shown. Secured to the wall of the sump 110 is a bearing 112 carrying an oil pump tube 114 driven through a gear 116 from the propeller-speed gear 92. The pump comprises a tube whose lower end is close to the bottom of the oil sump, the lower end of the tube having a relatively small orifice 118 through which lubricant may enter the tube. The tube 114 acts as a centrifugal pump when rotated, causing oil to rise within the tube and to overflow from the upper end thereof. The lubricant issuing from the top of the tube is sprayed and distributed throughout the gear mechanism whereby proper lubrication of the gears and bearings is maintained at all times. Surplus oil returns to the sump 110 by gravity. Appropriate oil seal rings 118 and 119 are provided between the rotating propeller assembly and the stationary housing 32 to minimize leakage of lubricant from the propeller assembly. Since the housing and lubricating system is not under pressure, leakage of lubricant is unlikely, and even should lubricant level in the sump 110 be lower than that which might normally be desired, the gearing system may operate effectively for long periods since the gear loads and bearing loads in the system are not critical.

As shown in Fig. 1, the propeller is adapted for hot gas de-icing, the stationary housing 32 being provided with an external diagraphm 120 having a peripheral seal ring 122 sealingly engaging a cylindrical flange 124 formed on a backplate 126 secured to the propeller hub 10. The backplate 126 is provided with a plurality of openings 128 equal in number to the number of blades if desired; ducts 130 lead from these openings into the hollow forward portion 132 of a spinner 134, the spinner forward portion being isolated from the spinner rearward portion by a diaphragm 136. Hot gas is fed through the diaphragm 120 from a duct 138 whence it transfers to the ducts 130 through the space between the diaphragm 120 and the backplate 126. Thence de-icing fluid passes to the spinner forward end, through a duct 138 and to the hollow propeller blades through ducts 140. The duct 138 is secured to the front end of the propeller hub and includes a baffle 142 to mask the end of the propeller shaft and to assist in directing hot gas radially outwardly to the blade ducts 140. The latter are sealed in the propeller hub and are led through the blade supporting bearings and associated parts so that the hot de-icing gas will not come in direct contact with the bearing elements. The rear edge of the spinner 134 is secured to the periphery of the backplate 126 while forward support is given to the spinner by the baffle 136 whose periphery is secured to the spinner by appropriate means, not shown.

Reference may now be made to Figs. 3 through 6 wherein the electrical arrangements of the propeller are shown in schematic form. The four wiring diagrams are the same but in the different figures, different circuit adjustments are shown. The active circuits are shown in heavy lines in respective figures. Fig. 3 represents the circuit adjusted for pitch increase. The amplidyne generator is represented at 94 and includes, in a manner known in the art, a compensating field 150, an anti-hunt field 152 and a control field 154. Across the generator output is a resistor 156 which is tapped at 158, the lower portion 160 of the resistor being in the circuit of the control field 154. When an excess of external control voltage is applied to the control field, rapid starting of generator output will be initiated. This generator output is later reduced by the counter-potential from the portion 160 of the resistor 156 opposing control field signal voltage to a level established by the final, net, control field voltage. The generator, through the leads 162 and 164, provides power to the armature of the propeller pitch changing motor 30, this motor having a shunt field externally excited by direct current power from the aircraft power supply.

As is well known, the amplidyne generator produces large energy outputs which may be controlled with great sensitivity and precision by small control field voltages. Since the amplidyne generator is driven by propeller rotation, as previously described, it is available to generate current for propeller blade pitch change while the propeller is rotating at a reasonable speed. The energy output of the generator will be some function of propeller speed.

A speed sensitive switch assembly 166 is incorporated in the propeller control system, preferably being located in an auxiliary housing at 168 (Fig. 2) on one end of the amplidyne generator. This switch may be of the centrifugally operated type similar in general to starting switches on split phase induction motors. The switch serves, while the propeller is rotating at a substantial speed, to connect the amplidyne generator to the propeller pitch change motor 30 and serves, when propeller speed is low, to connect the propeller pitch changing motor 30 to a separate source of D. C. power. This arrangement will be amplified in conjunction with the description of Figs. 5 and 6. In Figs. 3 and 4, it is assumed that the propeller is operated at normal speed and that the amplidyne generator is capable of supplying electrical power to the propeller pitch changing motor.

A reverse switch assembly 168, and a limit switch assembly 170 is incorporated in a control box 172 (Fig. 2), the connections from the box 172 being made to the pitch changing motor 30 and to the amplidyne generator 94 through conduits 174 and 176 (Fig. 2). In the schematic diagram of Fig. 3, the mechanism shown in the lower portion of the diagram is also contained in the control box. This mechanism includes a potentiometer 180 the ends of which are connected to a source of D. C. voltage. A center tap 182 of the potentiometer connects through the speed switch 166, the switch 168 and the limit switch 170 to the amplidyne control field 154. A sliding rate of pitch change control member 184 carries a contact 186 slidable along the potentiometer winding to pick up positive or negative voltages from the potentiometer, the slider connecting through the speed switch 166 to one terminal of the control field 154.

The member 184 is movable in response to increase or decrease pitch demands from a regulator system normally associated with a gas turbine, not forming a part of this invention. Such regulator mechanism calls for propeller pitch increase and decrease at varying rates in accordance with the operating conditions of the power plant. Accordingly, if an increase pitch demand is made by the regulator the member 184 moves upwardly as shown and applies a voltage on the control field 154 causing the amplidyne generator to deliver energy to the pitch changing motor 30 to cause propeller pitch increase at the desired rate. Concurrently with the increased pitch demand, the member 184, through a cam 188 associated therewith, moves the multiple switch 168 to a position which sets up certain circuits. A switch unit 190 of the multiple switch 168 is closed to connect with a switch unit 192 of the limit switch assembly 170 whereby the control field voltage is transmitted from the potentiometer to the control field. Should the actual pitch of the propeller increase to a point where the switch 192 is opened by virtue of the rise of a switch operating nut 194 on a screw shaft 196 rotated by the motor 30, the control field power is cut off. If pitch increase is carried only to some point short of the increase pitch limit, such as feathering, the circuit system remains as shown in Fig. 3 without reswitching of the components.

If a decreased pitch demand is made by the member 184, as in Fig. 4, the slider 186 picks up a potential of opposite polarity (from that for increasing pitch) from the potentiometer 180, transmitting it to the control field to cause reversal of the direction of current flow from the amplidyne generator 94 to the blade pitch motor 30, with consequent rotation of the motor in a direction to decrease pitch. Concurrently with the decrease pitch call by the member 184, the cam 188 throws the switch assembly 168 to its other position, closing an alternate set of switches and in particular closing a switch 198 which provides a path for the control field voltage through the low pitch limit switch unit 200 of the switch assembly 170. Should the decrease pitch call continue to the point where the low pitch limit stop is reached, the switch 200 will be opened cutting off control field voltage. The switch 200 at this time connects a pair of contacts 202 when the low pitch limit is reached short circuiting the control field 154 to establish dynamic braking of the generator-motor circuit.

In both Figs. 3 and 4, it will be observed that the direction of current flow to the control field is in one direction for pitch increase and in the other direction for pitch decrease, which produces in the amplidyne power circuit, opposite flow of current for the respective adjustments.

As has been inferred before, a situation can exist where propeller speed is low and where the speed of the amplidyne generator is nil or so low as to produce inadequate current. This condition exists when the propeller is not rotating and also at a high pitch propeller setting near or at the feather position. In order that pitch changes may be effected even with the amplidyne generator speed low, the speed switch 166 disconnects the amplidyne generator from the motor 30 and connects the motor to a source of D. C. power supply. This condition is exemplified in Figs. 5 and 6. Fig. 5 shows the circuit condition in a call for return from feather, it being assumed that the propeller has been feathered and that the switch 192 has broken the previously applied pitch increase circuit so that it closes points 204 in the feather limit switch. In this circuit arrangement (Fig. 5), a call for decrease pitch has been made by the member 184 which thus throws the switch assembly 168 to connect the D. C. power leads 206 leading into said switch to the speed switch 166 and to the low pitch limit switch 200, whence D. C. power leads directly to the armature of the motor 30 to cause rotation thereof in a pitch decreasing direction. As blade pitch reduction occurs, it is normally expected that the propeller will begin to windmill and as the propeller picks up speed, the amplidyne generator will attain sufficient speed to provide propeller pitch changing power. As the critical speed is attained, the speed switch 166 throws over to reconnect the amplidyne generator into the system and to disconnect the D. C. power supply leads 206 from the pitch change motor 30. Thereupon, pitch decrease may continue as demanded by the member 184 in accordance with the circuit arrangement of Fig. 4 previously described.

In the last phase of feathering operation, feathering normally having been initiated by an increase pitch demand in accordance with the circuit arrangement of Fig. 3 and the description associated therewith, propeller speed may decrease to the point where the speed switch 166 throws the motor 30 from the amplidyne generator to the D. C. power supply. Then, the D. C. power supply leads 206 are connected through the switch assembly 168, the speed switch 166, and the upper limit switch 192 of the switch assembly 170 directly to the propeller pitch changing motor 30 causing continued change of pitch in an increase direction until the feathering position is reached, when the switch 192 breaks from its contacts 207. Thereupon, the system comes to rest since power supply to the pitch changing motor is cut off. The switch 192 concurrently closes contacts 204, short circuiting the motor armature to provide a dynamic lock. No change will occur until a decrease pitch call is made by the member 184, which will bring into play the active circuits shown in Fig. 5 and described heretofore. The power demand on the external D. C. supply (normally the airplane supply) is relatively low as compared with the power demand which can be made on the generator, so that the external D. C. power supply is never overloaded.

In the above functional explanation of the circuit diagrams, a highly detailed explanation of all elements thereof has been avoided since it is considered that a clear understanding of the circuit arrangements may be gained by a study of the drawings. It will be noted that the four diagrams bring into play all connections in the system excepting that conductors 208, 210 and 212 associated with the switch assemblies 168 and 170 are not heavy-lined in any one of the four diagrams. These conductors and associated switches will at times become active when high or low pitch limits are reached, to short circuit the motor 30 or the control field 154 to provide dynamic locking of the motor 30 to prevent pitch change except when it is demanded.

The above description in connection with Figs. 3, 4, 5 and 6 related to a rate type of propeller pitch control, wherein pitch increase and decrease at varying rates may be called for by the control equipment. The different voltages derived from the potentiometer 180 will produce substantially proportionally different rates of pitch change. Pitch indication is also required in connection with the rate type control and to this end, the pitch indication may be carried to the control apparatus by an appropriate motion takeoff from the propeller pitch change motor 30 or from the limit switch actuating shaft 196. Dotted line 214 represents schematically a driving connection from the pitch changing motor 30 to the limit switch shaft 196 and the dotted line 216 represents a suitable power takeoff from the limit switch shaft 196 to provide pitch indication for the power plant control system. The pinion 56 in Fig. 2, leading into the control box 172, provides such a drive for pitch indication and for operating the limit switches.

Fig. 7 shows a schematic control system for the same sort of propeller as heretofore described, adapted for blade pitch angle control or so-called beta control. Such a system is useful in conjunction with a power plant governing and regulating system having a signal output element whose motion is dependent upon a demand for a specific pitch angle of the propeller rather than for a rate of pitch increase or decrease. The amplidyne generator 94 and its associated field windings 150, 152 and 154 are the same as described previously. The pitch changing motor 30 with its D. C. excited shunt field is the same as that described.

In Fig. 7, a speed responsive switch 220, operated in the same fashion as indicated before (for the switch 166), serves to connect both power leads from the amplidyne generator to the motor 30 when the amplidyne generator is producing power, said switch 220, when propeller speed is low, connecting the motor 30 to D. C. power leads 222 and 224.

The blade angle control arrangement for the amplidyne system comprises, for example, a blade angle control rod 226 having a yoke 228, one end of the yoke carrying a potentiometer bar 230. The bar consists of two solid contact plates 232 and 234 spaced apart and joined by a potentiometer winding 236; a center tap from the winding leads to one terminal of the amplidyne control field 154. The bars 232 and 234 are connected across a D. C. voltage supply. The other terminal of the amplidyne control field 154 is connected to a slider 238 carried by a nut 240 movable along a screw shaft 242 which is rotated by a power take-off connection 214 from the pitch change motor 30. The position of the nut 240 on the screw shaft 242 at any time will be representative of a specific blade pitch angle setting of the propeller.

With a call for pitch different from the pitch angle at which the propeller may currently be set, the member 226 is moved, for instance, to the left. Thus, a voltage difference is established between the slider 238 and the center tap of the potentiometer 236, this voltage being impressed on the control field 154 and causing the amplidyne generator to supply pitch changing power to the motor 30. As pitch change occurs, the screw shaft 242 will be turned in the direction of the new desired pitch setting and will continue until zero potential exists across the amplidyne control field. Thereupon, the new pitch position will be established and no further pitch change will occur, and the motor 30 will be dynamically locked since the control field 154 is short circuited. The solid bars 232 and 234 of the potentiometer assembly provide full available control field voltage when a drastic change in pitch is demanded by the pitch control member 226. Pitch change at maximum rate will occur until the slider 238 reaches the potentiometer winding 236 whereupon the control field voltage will gradually diminish until the new pitch setting is reached, thereby tapering off the rate of pitch change of the propeller and preventing overshooting of propeller pitch. When calls are made for small blade pitch angle changes, the member 226 may only move the potentiometer center tap a short distance away from the slider 238 whereby the slider still bears upon the wound portion of the potentiometer. In this situation, propeller pitch correction at a reduced rate of pitch change will be afforded. The latter mode of operation is most likely to occur during normal governing operation of the power plant while pitch change at full rate will occur when calls for feathering, return from feathering, reverse pitch, and return from reverse pitch are made upon the propeller.

Parallel with the potentiometer bar 230 is an insulating bar 248 carrying two pairs of contact strips, one pair comprising the strips 250 and 252 and the other pair comprising the strips 254 and 256. An insulating space is left between the strips 250 and 254 and between the strips 252 and 256, this space lying opposite the center tap of the potentiometer winding 236. In this space is disposed a shorting bar 257. The strip 250 is connected to the strip 256 and to one lead of a D. C. power supply. The strip 252 is connected to the strip 254 and to the other lead of the D. C. power supply. The nut 240 carries an insulating member 258 on which are mounted sliders 260 and 262, the former being engageable with one or the other of the strips 250 or 254, and the latter being engageable with one or the other of the strips 250 or 256. These sliders 260 and 262 are connected to the motor leads 222 and 224. When the speed switch 220 shifts as a result of low propeller speed, connecting the motor 30 to the conductors 222 and 224, D. C. power becomes available to the motor 30 from the D. C. supply. With this adjustment of the system, a pitch change call made by the member 226 will connect the D. C. power supply to the pitch change motor 30 through the conductors 222 and 224, the direction of current flow depending upon whether a call for increased pitch or decreased pitch is made. Propeller pitch change will result from operation of the motor 30 and as this occurs, the screw shaft 242 will shift the nut 240 and sliders 260 and 262 to the shorting bar 257 between the strips 250—256 to terminate any further pitch change, and to dynamically lock the motor 30 since its armature becomes short circuited.

The system of Fig. 7, above described, is a follow-up arrangement to terminate pitch change when a desired pitch has been reached. It is clear that the major components of the propeller system may be adapted either for rate control or pitch angle control merely by modifying the electrical control system per se which ordinarily is contained wholly within the control box 172 shown in Fig. 2. In Fig. 2, the control box includes a member 266 which may be construed either as operating on the rate control cam 184 of Figs. 3 through 6, or on the pitch angle control member 226 shown in Fig. 7.

While the drawings and description have stressed a unitary propeller system wherein the amplidyne generator forms a part of the propeller assembly, it will be clear to those skilled in the art that the amplidyne generator, if desired, may be disposed remotely from the propeller. Since amplidyne generators in general are somewhat heavier and more bulky than conventional generators of similar rating, the remote location of the generator may be desirable when particularly large propellers are used or where particularly large pitch changing power is required by the design or duty of the propeller. It is also within the scope of the invention to utilize a pitch changing motor disposed in locations other than on a propeller assembly. For instance, said motor could be secured to an engine unit and its power transmitted to the propeller proper through appropriate intergearing. It is further within the scope of the invention to dispose the pitch changing motor on the propeller to rotate therewith, in the same general manner as is disclosed in Patent No. 1,951,320.

The particular mechanisms involved in the schematic circuit diagrams may take a large number of different physical forms and no limitations are intended to be imposed on the scope of the invention by the particular arrangements indicated.

The potentiometer arrangements from which amplidyne control field voltages are derived, may be dispensed with in installations where generator control field voltage signals are supplied by the engine or turbine governing and control mechanism.

It may be further noted that pitch locking of the propeller blades, when no pitch change is called for, is inherently attained by the dynamic braking afforded by the generator-to-motor circuit. In addition, the drive from the motor 30 to the propeller gearing may incorporate a spring brake, as at the bearing 48, allowing gear train drive in either direction by the motor but preventing rotation of the gear 52 under the influence or torque from the propeller end of the gear train.

Though two embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. In a controllable pitch propeller having hub sockets and blades mounted therein for pitch change, an inboard hub extension, a member piloted on said extension secured from rotation, a generator on said member, means for driving said generator actuated by relative rotation between the member and propeller, a motor electrically coupled to said generator, means drivably connecting said motor to said blades for changing the pitch thereof, means to control the electrical energy output of said generator, an auxiliary supply of electrical energy, and means responsive to propeller rotational speed to switch the motor input to said generator or said auxiliary supply, accordingly, as propeller rotational speed is high or low.

2. In a controllable pitch propeller having hub sockets and blades mounted therein for pitch change, an inboard hub extension, a member piloted on said extension secured from rotation, an electric motor on said member, gear means to transmit rotation of the motor armature to said blades for changing the pitch thereof, a controllable electric power supply for said motor dependent on propeller rotation, an independent electric power supply, and propeller speed responsive means to connect said dependent supply to the motor at high propeller speeds and said independent supply to the motor at low propeller speeds.

3. In a controllable pitch propeller having hub sockets and blades mounted for pitch change therein, the combination of a propeller driven generator, an electric motor energized by said generator, means drivably connecting said motor with said blades, means for adjusting electrical output of said generator, a separate source of motor supply electrical energy, and means responsive to low rotational speed of said propeller for connecting said separate source to said motor and for disconnecting said generator.

4. In a controllable pitch propeller having a hub and blades mounted for pitch change therein, a non-rotative housing piloted on said propeller, an electric motor on the housing having gearing connections with said blades, said connections being so arranged as to provide fixed blade pitch when said motor is deenergized, substantially constant potential means to excite the field of said motor, an amplidyne generator on said housing having a rotor geared to and driven by said propeller, said generator rotor being direct-connected electrically to said motor armature and said generator having a series field winding and a separately excited control field winding, said control field when energized causing said generator to produce power to operate said motor, means to energize said control field comprising a D. C. power source, means to adjust the potential and polarity of said D. C. power applied to said control field, a separate power source for said motor armature, and means responsive to the R. P. M. of said propeller for switching said motor armature between connection with said amplidyne generator and with said separate power source, and means connected to and operable with said adjusting means to control the polarity of connection of said separate power source to said motor armature.

5. In a controllable pitch propeller having hub sockets and blades mounted therein for pitch change; an electric motor including a rotatable armature with a commutator, the armature being mechanically connected to said blades to change blade pitch upon armature rotation in the motor, said motor having a constantly D. C. excited shunt field winding; a generator having an armature with a commutator, driven by said propeller, said generator having pairs of commutator-engaging opposed brushes disposed at 90 degrees, the brushes of one pair being connected together and the brushes of the other pair being connected to the motor armature commutator; a control field winding for the generator aligned with said latter pair of brushes; a source of D. C. potential, a potentiometer having its ends connected across said D. C. source, a center tap on said potentiometer connected to one end of said control field winding, a sliding contact movable along said potentiometer to either side of said potentiometer center tap and connected to the other end of said control field winding, and means responsive to the speed of said propeller to disconnect the motor armature from said generator armature and to connect the motor armature to said D. C. source.

ROBERT K. TIEDEMAN.
JOSEPH M. MERGEN.
CHARLES W. CHILLSON.

REFERENCES CITED

The following references are of record in the file of this patent:

UNITED STATES PATENTS

| Number | Name | Date |
|---|---|---|
| 1,510,086 | Englesson | Sept. 30, 1924 |
| 2,069,846 | Pecker | Feb. 9, 1937 |
| 2,186,791 | Willgoos | Jan. 9, 1940 |
| 2,370,675 | McCoy | Mar. 6, 1945 |
| 2,376,673 | Duchaussoy | May 22, 1945 |
| 2,437,188 | Forsyth | Mar. 2, 1948 |
| 2,440,130 | Waterman | Apr. 20, 1948 |
| 2,460,587 | Larsen | Feb. 1, 1949 |

FOREIGN PATENTS

| Number | Country | Date |
|---|---|---|
| 824,046 | France | Nov. 3, 1937 |
| 513,339 | Great Britain | Oct. 10, 1939 |

OTHER REFERENCES

Ser. No. 345,132, Florian et al. (A. P. C.), published May 18, 1943.